H. ALLEN.
VEHICLE WHEEL.
APPLICATION FILED FEB. 7, 1917.
1,253,921.
Patented Jan. 15, 1918.
2 SHEETS—SHEET 1.
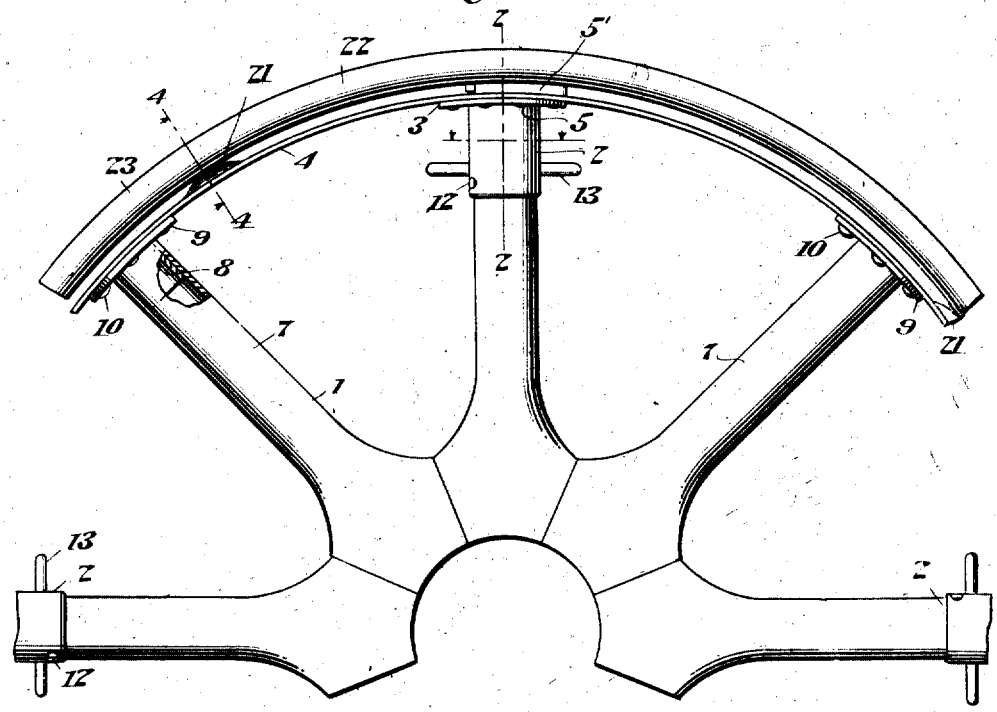
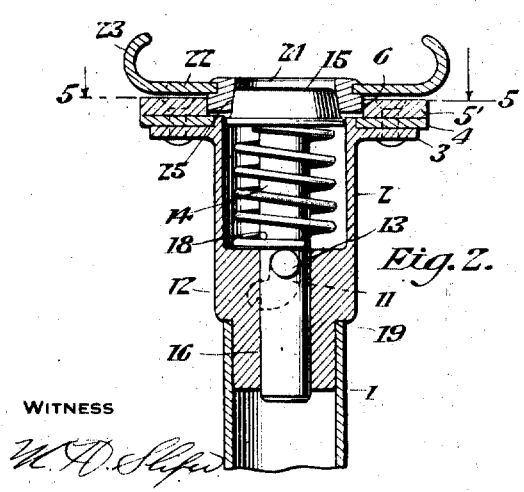
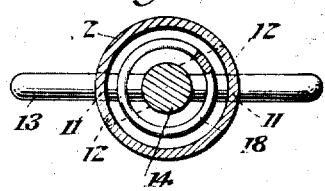
WITNESS
INVENTOR
Harry Allen
BY Victor J. Evans
ATTORNEY

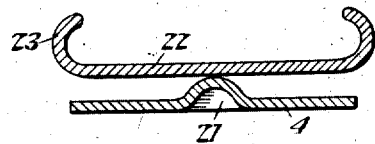
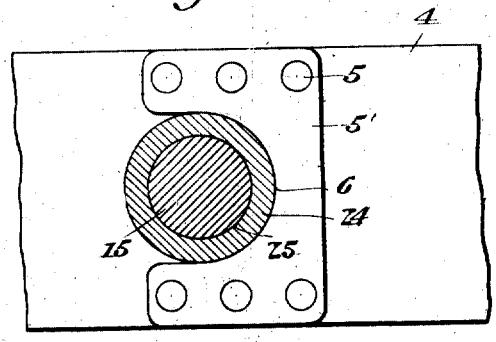
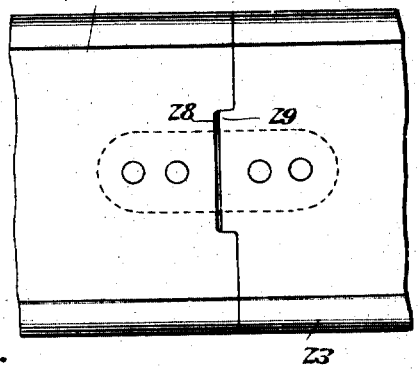
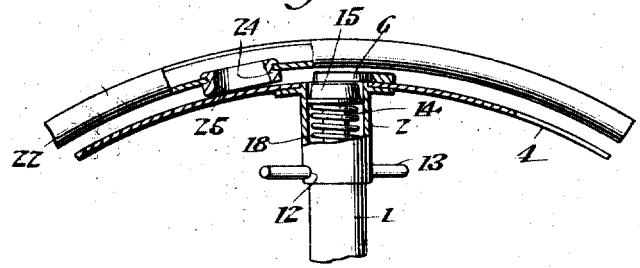

UNITED STATES PATENT OFFICE.

HARRY ALLEN, OF CLEVELAND, OHIO.

VEHICLE-WHEEL.

1,253,921.     Specification of Letters Patent.     Patented Jan. 15, 1918.

Application filed February 7, 1917. Serial No. 147,192.

*To all whom it may concern:*

Be it known that I, HARRY ALLEN, a citizen of the United States, residing at Cleveland, in the county of Cuyahoga and State of Ohio, have invented new and useful Improvements in Vehicle-Wheels, of which the following is a specification.

The present invention relates to improvements in the construction of vehicle wheels.

In carrying out my invention it is my purpose to produce a vehicle wheel wherein the tire carrying rim may be easily and quickly removed from the fixed rim of the wheel without the employment of tools, so that a pneumatic tire may be readily positioned thereon or removed from the wheel.

It is a further object of the invention to provide means comprising spring pressed members associated with the spokes of a wheel or with elements connected with the spokes of a wheel that are designed to coengage with the tire carrying rim of a wheel for holding the said rim upon the fixed rim, but at the same time permitting of the ready separation of the tire carrying rim from the fixed rim of the wheel when desired.

It is a still further object of the invention to produce spring pressed means for effectively retaining a tire carrying rim around the fixed rim of a wheel and to hold the said tire carrying rim against circumferential movement in a longitudinal direction or against transverse movement regardless of the stress or strain to which the tire carried by the rim will be subjected.

It is a still further object of the invention to produce a device of this character which shall be of a comparatively simple construction; which may be readily applied with only slight alterations to the wheels of any ordinary vehicle; which will be comparatively cheap to manufacture, and which will perform the functions for which it is devised with accuracy and efficiency.

With the above and other objects in view the improvement resides in the construction, combination and arrangement of parts set forth in the following specification and falling within the scope of the appended claims.

In the drawings:

Figure 1 is a side elevation of a portion of a vehicle wheel constructed in accordance with the present invention, Fig. 2 is a sectional view approximately on the line 2—2 of Fig. 1 but taken upon a greatly enlarged scale, Fig. 3 is a similar sectional view approximately on the line 3—3 of Fig. 1, Fig. 4 is a similar sectional view approximately on the line 4—4 of Fig. 1, Fig. 5 is a sectional view approximately on the line 5—5 of Fig. 2, Fig. 6 is a perspective view of one of the bushing members associated with the rim, removed from the rim, Fig. 7 is a plan view of the rim at the meeting ends thereof, and Fig. 8 is a detail enlarged elevation, partly in section, illustrating the arrangement of parts when the spring pressed member is moved to be disengaged from the bushing of the tire carrying rim, and the said rim moved circumferentially of the fixed rim to bring the same out of engagement with the block upon the felly to permit of the removal of the tire carrying rim from the fixed rim.

The spokes 1 of the wheel may be of the ordinary wooden construction or the same may comprise tubular metal members. When the wheel is constructed of wood I arrange upon the end of every other spoke or each alternating spoke a sleeve or socket 2 but it will be apparent that when the wheel is constructed of metal the socket 2 may be dispensed with.

The socket 2 or the ends of the spokes when the same are tubular are provided adjacent its outer end with a continuous flange 3, the said flange being secured in any desired or preferred manner to the fixed rim 4. It will be noted that the end of the sleeve or socket member 2 is extended a suitable distance beyond the flange 3, the said extension being equal in length to the thickness of the fixed rim and is received in a suitable opening in the said fixed rim. The securing elements 5, at the diametrically opposite sides of the sleeve or socket 2 in addition to engaging with the fixed rim 4 also engage a block member 5' and thus secure the block to the fixed rim. The block is centrally provided with a substantially semicylindrical depression or cut-away portion 6, the inner wall of which being arranged approximately in a line with the opening in the fixed rim through which the end of the socket member 2 passes and the purpose of the block and the opening 6 therein will be presently described.

The spoke members disposed between the spokes provided with the sockets or secured to the fixed rim in the manner just described, may have their outer edges flanged and securing elements passed through the said flange to connect the same to the fixed rim 4, or the said ends of the referred to spokes indicated for distinction by the numerals 7 may receive or be received in sleeve or ferrule members 8 that are provided upon their outer ends with flanges 9, the said flanges being secured to the fixed rim, as at 10.

The socket members 2, adjacent the inner ends thereof have their side walls provided with diametrically oppositely disposed vertically extending slots 11 which terminate in angularly disposed branches 12, the slots 11 being arranged diametrically opposite each other but the branches 12 of the respective slots extend angularly in opposite directions therefrom. It will thus be noted that each of the sleeves or socket members 2 is provided upon its opposite faces with substantially L or bayonet slots and these slots are adapted to receive bail or handle members 13 provided upon the stems 14 of headed members or plungers 15. The stems 14, at the outer ends thereof, are arranged in suitable bearing openings 16 in the ends of the spokes or in the reduced or solid ends of the sockets 2. The bores of the socket members 2 terminate approximately in a line with or outward of the bayonet slots therein, and the opening 16 for the stem 14 of course communicates with the bore of the said sleeve or socket, and consequently the angular portions of the bayonet slots are extended a suitable distance outward of the said opening but communicate with the opening. Surrounding the stems 17 and exerting a pressure between the heads thereof and the lower walls 19 of the sleeve or socket members are helical springs 14 which normally project the plunger heads 15 outward of the sleeves or sockets for a purpose which will presently be described, but it will be noted that when pressure is exerted upon the members 13 in an inward direction and the said members turned to enter the angular portions 12 of the bayonet slots the plungers 15 will be held within the sleeves or sockets 2 against the pressure of the said springs.

The fixed rim 4, at spaced intervals, and preferably adjacent to the spokes 7 of the wheel, is provided with outwardly extending enlargements 21 which are preferably rounded and which may provide contact members for the inner periphery of the tire carrying rim 22 which is, of course, arranged around the fixed rim 4. The rim has its sides provided with the inwardly extending angularly disposed flanges 23 whereby to receive the ribs or enlargements upon the inner edges of the casing of a pneumatic tire (not shown), and the rim 22 at spaced desired intervals is provided with openings within which are arranged bushings 24. These bushings may be attached in any desired or preferred manner but preferably the same are provided with reduced extensions whereby the shoulders between the bushings and the said reduced extensions are arranged upon the inner face of the rim and the said extensions are then bent over the outer face of the said rim. The bore of each of the bushings is flared from its outer to its inner end, as indicated by the numerals 25, and likewise the plunger heads 15 comprise substantially frusto-conical members to be snugly received in the flared portion 25 of the bushings. It is to be understood that one of the bushings is disposed to receive one of the plunger heads and when so engaged by the said plungers the bushings are received in the rounded openings 6 in the blocks 5. By this arrangement it will be noted that the rim is held against lateral movement with respect to the fixed rim, and will be, of course, held against circumferential movement by the engagement of the plunger heads with the said bushings. The rim is, of course, provided with an elongated slot through which passes the valve stem of the pneumatic tire, and the rim is in the nature of a split member, one of the ends of the same being centrally provided with a depressed portion or groove 28, the other end being provided with an extension forming a tongue 29 that is adapted to be received in the said groove and the edges of the tongue contact with the walls of the groove so that lateral movement of the rim at the meeting ends thereof will be thus prevented. In addition to this, means, indicated by the dotted lines in Fig. 7 of the drawings, is adapted for securing the meeting ends of the rims in a longitudinal or circumferential direction and such means may be of a nature similar to that commonly employed for this purpose.

As previously stated when pressure is exerted upon the handle members or bars 13 to move the stems 14 and bring the heads 15 to within the socket members 2, the said heads will, of course, be brought out of engagement with the bores 25 of the bushings 24 and when the handle members are turned in the angular portions of the bayonet slots the bushings will be sustained in their retracted positions. The rim is thus relieved from engagement by any other part of the wheel except by the blocks 5 engaging with the bushings. It will be apparent that by moving the rim longitudinally the circumferential direction the bushings may be brought out of engagement with the rounded openings 6 in the blocks and the rims may be moved laterally off of the fixed rim of the wheel.

From the above description taken in connection with the drawings the simplicity of the device as well as the advantages thereof will, it is thought, be perfectly apparent to those skilled in the art to which such invention appertains without further detailed description.

Having thus described the invention, what I claim is:

1. In combination with a wheel having a fixed rim upon the spokes thereof, and a removable rim surrounding the fixed rim, said fixed rim having openings alining with certain of the spokes of the wheel, and the referred to spokes having hollow ends, spring pressed plungers within the said ends of the referred to spokes designed to engage with the openings in the removable rim, said mentioned spokes having bayonet slots, and laterally extending elements upon the spring pressed plungers designed to engage in the bayonet slots, whereby to permit of the plunger being received in the openings of the removable rim or being retained in the hollow end of the spoke out of such engagement.

2. In combination with a wheel having a fixed rim secured to the spokes thereof and a removable rim surrounding the fixed rim, certain of said spokes having sockets at the outer ends thereof, the fixed rim having openings alining with the sockets, reinforcing elements partially surrounding the openings, said sockets having bayonet slots, and spring pressed plungers in each of the sockets and having a laterally extending member designed to be received in the bayonet slots, the removable rim having openings designed to register with the openings in the fixed rim and to receive the spring pressed plunger, said plungers designed to be retained out of such engagement when the same is moved to bring the lateral element connected therewith in the opposite branch of the bayonet slots.

3. In combination with a vehicle wheel having a fixed rim secured to the spokes thereof, and provided with spaced openings, and a removable rim surrounding the fixed rim, of socket members secured to certain of the spokes and to the fixed rim and communicating with the openings in the latter, said sockets having bayonet slots at the sides thereof, a plunger head and a stem therefor, an angular handle for the stem passing through the bayonet slots, spring means between the inner wall of the sockets and the plunger heads whereby to project the said plunger heads through the said sockets, said heads being of a substantially frusto-conical formation, block members upon the fixed rim having substantially semi-cylindrical openings surrounding the sockets, the removable rim having spaced openings, bushings revolubly arranged in the openings, and having flared bores to receive the plunger heads when the said bushings are brought to aline with the openings in the fixed rim.

In testimony whereof I affix my signature.

HARRY ALLEN.